(12) United States Patent
Bittner

(10) Patent No.: US 8,251,314 B2
(45) Date of Patent: Aug. 28, 2012

(54) CARGO RECEIVING ARRANGEMENT FOR AN AIRCRAFT HOLD

(75) Inventor: Oliver Bittner, Verden (DE)

(73) Assignee: Airbus Operations GmbH, Hamburg (DE)

( * ) Notice: Subject to any disclaimer, the term of this patent is extended or adjusted under 35 U.S.C. 154(b) by 824 days.

(21) Appl. No.: 12/278,272

(22) PCT Filed: Jan. 30, 2007

(86) PCT No.: PCT/EP2007/000776
§ 371 (c)(1),
(2), (4) Date: Aug. 4, 2008

(87) PCT Pub. No.: WO2007/088020
PCT Pub. Date: Aug. 9, 2007

(65) Prior Publication Data
US 2009/0032641 A1 Feb. 5, 2009

(30) Foreign Application Priority Data
Feb. 2, 2006 (DE) .......................... 10 2006 005 200

(51) Int. Cl.
*B64C 1/22* (2006.01)
(52) U.S. Cl. .................................. 244/137.1; 244/129.5
(58) Field of Classification Search ............... 244/118.1, 244/118.3, 129.5, 137.1; 14/71.1
See application file for complete search history.

(56) References Cited

U.S. PATENT DOCUMENTS

| 3,836,101 | A | * | 9/1974 | Mattia et al. ................ 244/137.1 |
| 4,484,846 | A | * | 11/1984 | Engel et al. ...................... 410/69 |
| 4,696,609 | A | * | 9/1987 | Cole ................................. 410/69 |
| 5,312,071 | A | * | 5/1994 | Eilenstein-Wiegmann et al. ........................... 244/137.1 |
| 5,738,199 | A | * | 4/1998 | Moradians .................. 193/35 R |

OTHER PUBLICATIONS

International Preliminary Report on Patentability, The International Bureau of WIPO, Aug. 5, 2008, PCT/EP2007/000776.
Written Opinion of the International Searching Authority, European Patent Office, PCT/EP2007/000776.
Extract of Register of European Patents, European Patent Office for EP1979231—Cargo Receiving Arrangement for an Aircraft Hold.
Decision on Grant for Russia Patent Application Serial No. 2008135439/11(045190), PCT/EP2007/000776.
Examination Report for Chinese Patent Application 200780004314.7 (PCT/EP2007/000776).

* cited by examiner

*Primary Examiner* — Rob Swiatek
(74) *Attorney, Agent, or Firm* — Faier & Faier P.C.; James Michael Faier; Martin Faier

(57) ABSTRACT

A cargo receiving arrangement for an aircraft hold with a cargo receiving area provided therein with at least one folding loading bridge (4, 5, 6) and a loading door (20) which closes the aircraft hold in a swivelling manner in the region of the loading bridge, characterized in that a loading door inner face (23) of the loading door is designed in such a way that, when the loading door is swung to, the folding loading bridge folds upwards as a result of the contact with the inner face of the loading door. This is important especially in regions of varying aircraft width, since the loading bridge collides there with the loading door.

12 Claims, 5 Drawing Sheets

CARGO RECEIVING ARRANGEMENT FOR AN AIRCRAFT HOLD

Figure 1:
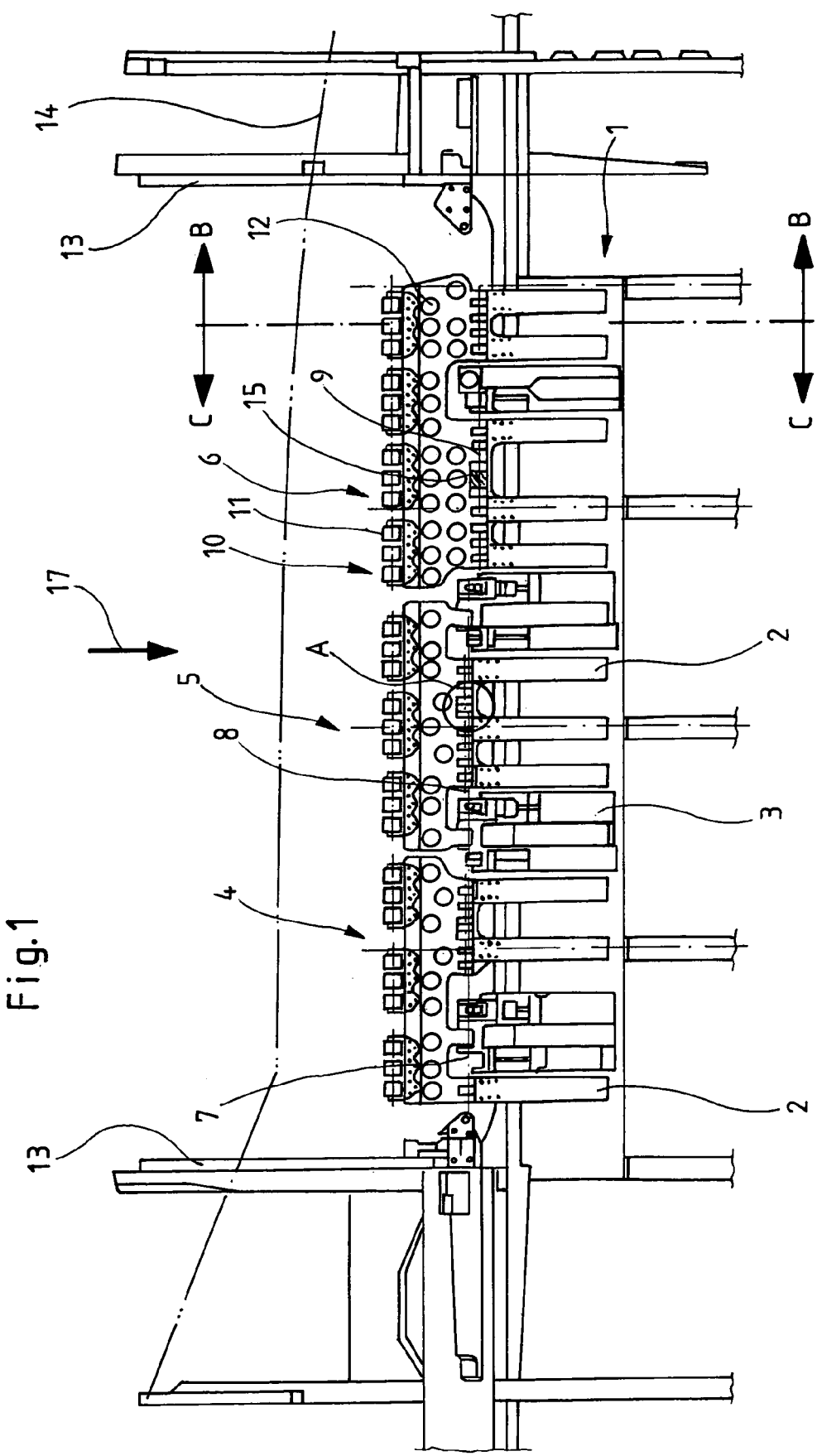

The invention relates to a cargo receiving arrangement for an aircraft hold with a cargo receiving area provided therein with at least one folding loading bridge and a loading door which closes the aircraft hold in a swivelling manner in the region of the loading bridge.

The loading doors or cargo doors of aircraft holds are as a rule located at the beginning and at the end of a fuselage.

In order to enable a trouble-free transfer of "ULDs" (Unit Load Device), which are conveyed up to the hold using loaders or special vehicles, the edges or edge regions of the cargo receiving area are designed as a rule as folding elements, which are also referred to as loading bridges. If a loader strikes against the latter during docking, said loading bridges can as a rule fold upwards, so that damage is avoided. For a simple transfer of ULDs, the distance between the transfer zones, i.e. the run-in area of the hold and the loader, should be as small as possible. For the docking and orientation of the loader, the hold should if possible have a straight edge parallel to the aircraft.

As a rule, however, the cargo door is located at the beginning or end of the fuselage, i.e. in the region of a narrowing of the fuselage, in which the available width of the hold changes, so that the loading bridges have to have different lengths if a straight edge parallel to the aircraft is to be produced. The longer loading bridges therefore provided in the narrower fuselage region then collide, however, with the aircraft wall, or more precisely the loading door. After completion of the loading procedure, therefore, the loading bridge has to be folded up in order to avoid damage to the door when the door is closed. A description of a special embodiment of an aircraft hold is known for example from DE 42 10 191 C1.

The problem underlying the invention is to provide a cargo receiving arrangement of the aforementioned kind, with which cargo doors can be reliably closed.

The solution to this problem takes place with a cargo receiving arrangement with the features of claim 1. Advantageous developments of the invention are described in the sub-claims.

With a cargo receiving arrangement for an aircraft hold with a cargo receiving area provided therein with at least one folding loading bridge and a loading door which closes the aircraft hold in a swivelling manner in the region of the loading bridges, provision is made as an essential part of the invention such that the inner face of the loading door is designed in such a way that, when the loading door is swung to, the folding loading bridge folds as a result of the physical contact with the inner face of the loading door. The loading door is typically held on a swivelling axle orientated horizontally above the cargo receiving area. The loading door, in particular the inner face of the loading door, is designed in such a way that loading bridges arranged in particular in the region of the narrowing of the fuselage make contact with the inner face of the loading door when it is swung to, in such a way that guidance of the loading bridge takes place such that the latter swings upwards.

The loading bridge preferably has at least one roller on the outside. Such a roller also serves to keep collisions of the loading bridge with the loader non-destructive, so that the loading bridge simply folds upwards when collisions occur with the loader. The roller is also preferably designed in such a way and the inner face of the loading door is preferably designed in such a way that the loading bridge with the roller rolls off on the inner face of the loading door and in this way folds upwards. The loading bridge preferably has at least two groups of rollers. In a preferred embodiment, the inner face of the loading door is designed in such a way that the loading bridge rolls off on at least two rollers from different groups of rollers on the inner face of the loading door. In a preferred embodiment, the loading bridge has four groups of rollers and the inner face of the loading door is designed in such a way that the loading bridge rolls off on two rollers, in particular precisely two rollers from two non-adjacent groups of rollers, on the inner face of the loading door.

In another preferred embodiment of the invention, the inner face of the loading door has at least one wedge-like roll-off surface. The roll-off surface is preferably adapted in its dimensions to the roll-off path of the roller of the loading bridge. The roll-off surface is therefore designed comparatively small in comparison with the loading door. The adaptation of the inner face of the loading door therefore preferably takes place by the assembly of one, two or more roll-off surfaces which are small in comparison with the loading door area.

In a further embodiment of the invention, the loading bridge is pretensioned with a spring. The effect of this is that, when the loading door is opened, the loading bridge is pushed back into the initial position. Even if a loader is conveyed to close to the aircraft, or more precisely to the loading bridges, the loading bridges fold away upwards as a result of the roll-off process of the rollers at the at the outer sides of the loading bridges and thus avoid a collision. By means of the additionally provided spring, the loading bridges are automatically pushed back downwards into the loading position after elimination of the cause for the collision. A further advantage that is achieved by the additional spring is the fact that rattling of the loading bridge is prevented. This is because the loading bridge is held in a defined position due to the spring pretensioning. The loading bridge is preferably pretensioned by the spring in the horizontally unfolded position. The spring is preferably arranged in the swivelling axis of the loading bridge. According to a further embodiment of the invention, the spring is split and fixed and pretensioned in the middle of the cargo receiving area.

Figure 2:
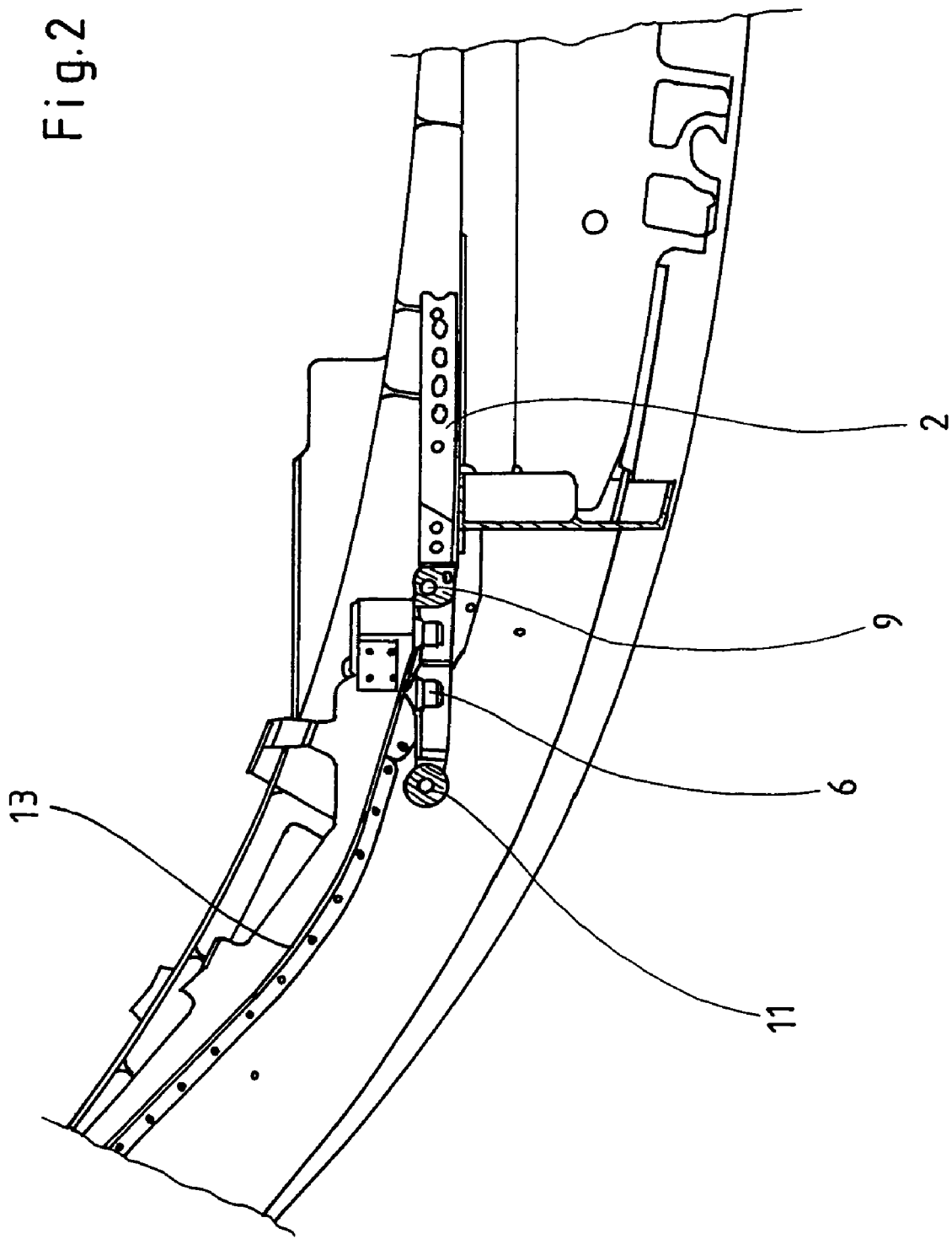
Figure 3:
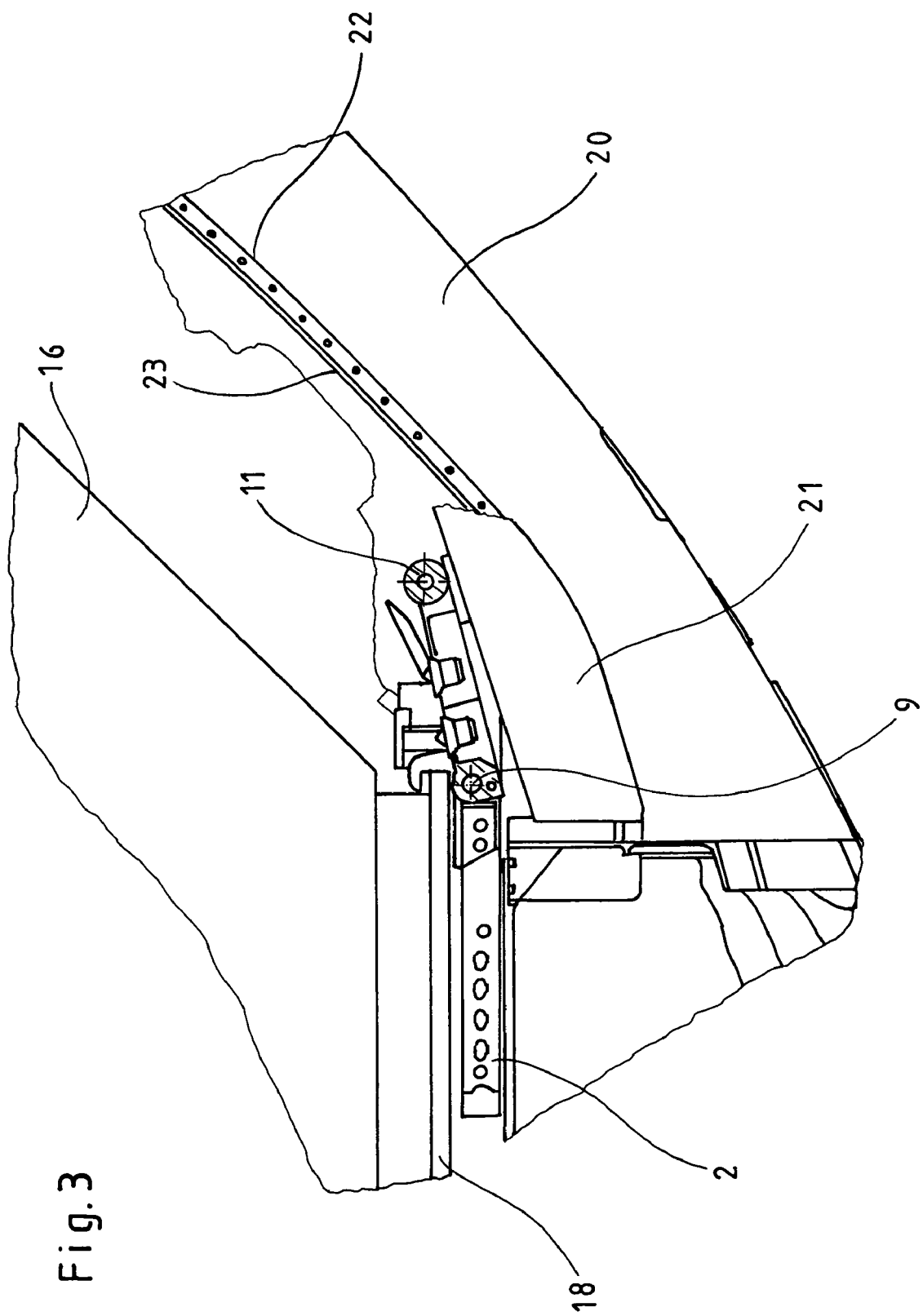
Figure 4:
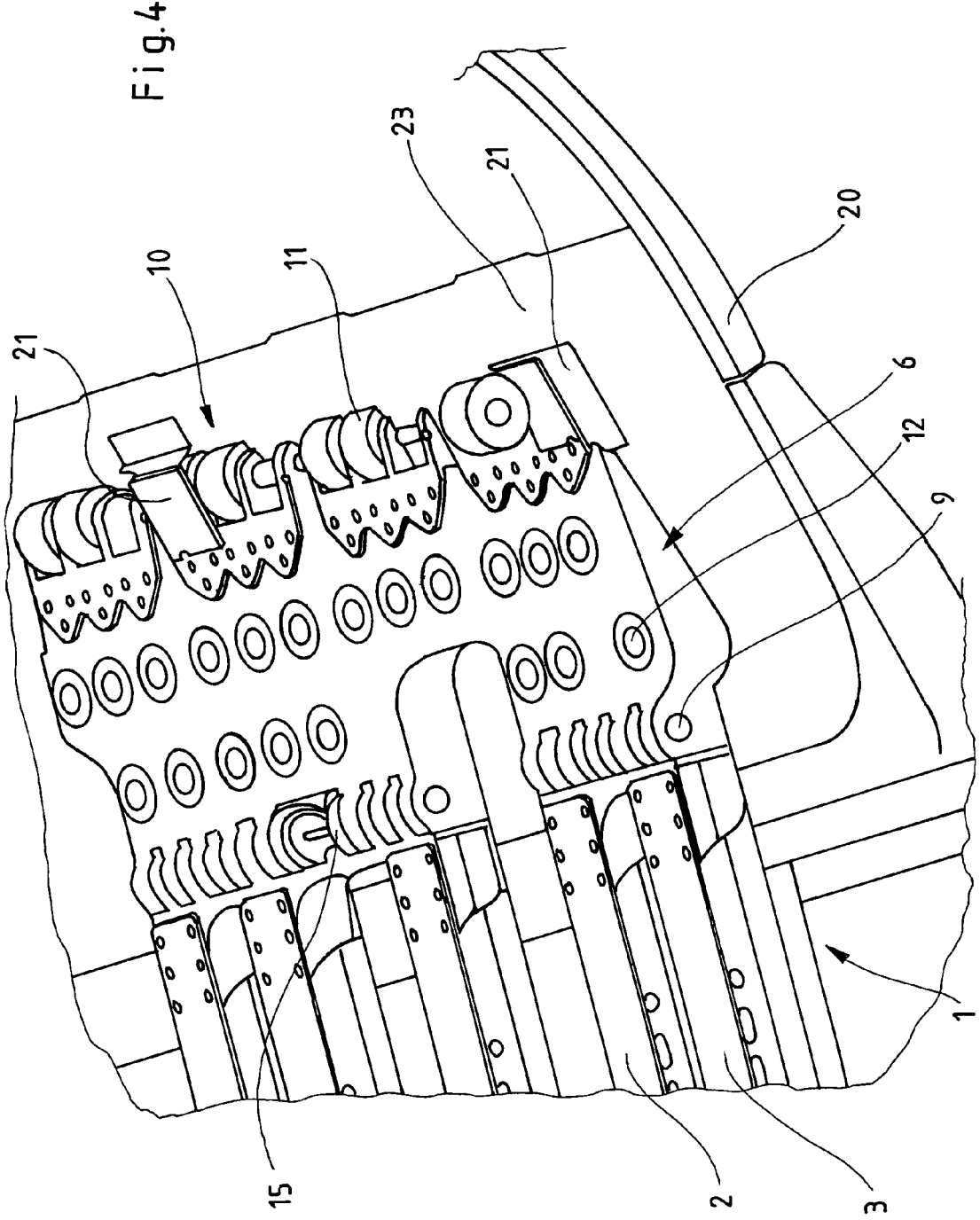
Figure 5:
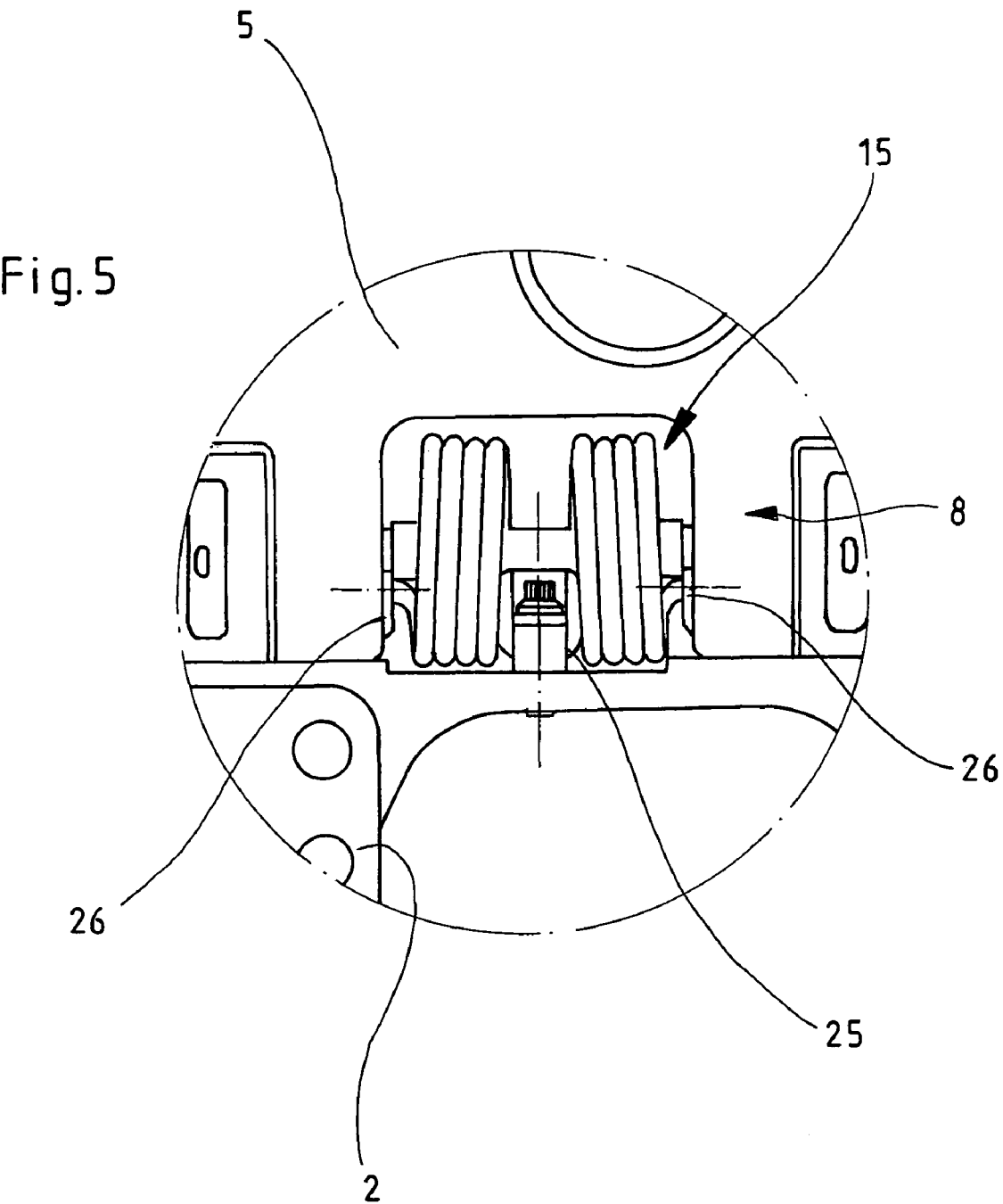

The invention is explained in further detail below with the aid of a preferred example of embodiment represented in the drawing. The schematic representations show, in detail, FIG. 1: a partial section of a cargo receiving area of an aircraft hold in the region of a loading door with three loading bridges;

FIG. 2: a cross-section through line B-B in FIG. 1 with a loading bridge with the loading door opened;

FIG. 3: a cross-section through line C-C in FIG. 1 with a loading bridge with the loading door closed;

FIG. 4: a perspective view of the loading bridge with the loading door closed;

FIG. 5: an enlarged representation of detail A in FIG. 1 with a spring arranged in the swivelling axis of the loading door.

FIG. 1 represents a partial section of a cargo receiving area 1 of an aircraft with three loading bridges 4, 5 and 6. The aircraft hold is located above cargo receiving area 1. The cargo is conveyed from the direction of arrow 17 to the cargo receiving area and delivered onto cargo receiving area 1. The front part of cargo receiving area 1 is designed in the form of swivellable loading bridges 4, 5 and 6, which in particular can fold upwards. Said loading bridges can be swivelled about swivelling axes 7, 8 and 9. This is advantageous especially when a loader is conveyed too close to the loading bridges and a collision occurs. Loading bridges 4, 5 and 6 can then fold upwards free from damage due to the rolling contact via rollers 11 arranged externally on the loading bridges. Rollers 11 are preferably arranged in roller groups 10 each with three to five rollers. Loading bridges 4 and 5 each have three roller groups 10 and loading bridge 6 has four roller groups 10. Arranged on the upper side of loading bridges 4, 5, 6 are spherical elements 12, which enable easier transport of the loads to be received. Shown in the region of cargo receiving area 1 lying behind are carriers 2 and loading door bars 3, which form the structural substructure of cargo receiving area 1 and make available hinges and linkages for holding loading bridges 4, 5 and 6. Plates (not shown here) with spherical elements 12 and/or other transport aids or fixing aids are mounted or placed on these carriers 2 and loading door bars 3. The whole represented region between two drawn-in wall lines 13 is covered or closed by a loading door, which cannot be seen in FIG. 1. The loading door extends between two wall surfaces 13. Dash-dot line 14 shows schematically the course of the external contour of the fuselage and also shows that, in particular, loading bridge 6 located on the right in FIG. 1 lies in the region of the narrowing of the fuselage, so that only a small area is available here. In order that the three loading bridges 4, 5 and 6 can form an edge parallel to the aircraft for better loading and unloading, loading bridge 6 is therefore designed wider than loading bridges 4 and 5, as emerges from FIG. 1. Whereas, in the example of embodiment shown here, loading bridges 4 and 5 lie inside the loading door also in the unfolded state represented, the space for this is insufficient in the region of loading bridge 6, so that a collision between the outer edge of loading bridge 6 and the loading door would occur. For this reason, loading bridge 6 has to be folded upwards, or more precisely is folded upwards according to the invention automatically by contact with the loading door.

FIG. 2 represents a cross-section through line B-B in the direction of the drawn-in arrow with the loading door opened. A part of a carrier 2 can be seen. Extending thereon in the right-hand region is further cargo receiving area 1. Swivelling axis 9 of loading bridge 6 with front roller 11 can be seen at the left-hand end of carrier 2. Wall line 13 runs in the background. This wall line 13 is also followed in a sealing fashion by the loading door face. It also becomes clear from this that the front part of loading bridge 6 lies outside of this line and that there would therefore be a collision.

FIG. 3 represents a cross-section through line C-C from FIG. 1 in the direction of the arrow drawn there, i.e. to the left, into the door region with the loading door closed. In this view, carrier 2 extends to the left in contrast with the representation in FIG. 3. Provided on carrier 2 is a receiving plate 18, on which a ULD 16 is set down here. Loading door 20 is closed in FIG. 3. Loading door line 22 corresponds to wall line 13. Loading bridge 6 is folded or swivelled upwards here about swivelling axis 9, so that loading bridge 6 is inside the loading door. The automatic folding upwards of loading bridge 6 is achieved by a corresponding adaptation of inner face 23 of the loading door, which is embodied here by a specially introduced roll-off surface 21. Roll-off surface 21 is designed wedge-shaped in a comparatively small region of inner face 23 of the loading door, so that roller 11 of loading bridge 6 shown in this sectional view rolls off on roll-off surface 21.

FIG. 4 represents in perspective view loading bridge 6 with loading door 20 closed and roll-off surface 21 of the loading door. The drawing is not a faithful representation in as much as loading door 20 is closed and loading bridge 6 is in the straight, unfolded state, so that the outer part of loading bridge 6, in particular rollers 11, push through inner face 23 of the loading door. Wedge-like roll-off surfaces 21 are drawn at two positions on inner face 23 of the loading door, i.e. at a roller 11 of front group 10 of rollers and at a roller 11 of the, as viewed from the front, third group 10 of rollers. As a result of the guidance of loading bridge 6 on at least two rollers 11 spaced apart from one another, i.e. rollers 11 which are arranged in two non-adjacent groups 10 of rollers, a uniform and parallel movement of loading bridge 6 is ensured. For the purpose of illustration, front roller 11 is detached and represented above roll-off surface 21. When loading door 20 swings to in a swivelling manner, rollers 11, to which two roll-off surfaces 21 are assigned, roll off on roll-off surfaces 21 and guide loading bridge 6 upwards. Loading bridge 6 swivels about swivelling axis 9, which is held at carriers 2 and loading door bars 3 of the cargo receiving area. Also provided in swivelling axis 9 is a spring 15, which pretensions loading bridge 6 into the unfolded position, so that, when loading door 20 is opened, loading bridge 6 is automatically brought back into the unfolded position.

FIG. 5 represents a detail view of spring 15, which is arranged on swivelling axes 7, 8, 9 of loading bridges 4, 5, 6. The axis of spring 15 is arranged in swivelling axis 8. Spring 15 itself is in two parts and is split around a central support 25 with in each case an equal number of turns. Spring support 25 is fixed in the middle on carriers 2 and is thus pretensioned. Spring 15 is designed as a torsion spring and is connected spaced apart from swivelling axis 9 at points 26 to loading bridge 6.

The invention claimed is:

1. A cargo receiving arrangement for an aircraft hold with a cargo receiving area (1) provided therein comprising at least one folding loading bridge (4, 5, 6) and a loading door (20) which closes the aircraft hold in a swiveling manner in the region of the loading bridge (4, 5, 6), whereby a loading door inner face (23) of the loading door (20) is designed in such a way that, when the loading door (20) is swung to, at least one folding loading bridge (6) folds upwards as a result of the contact with the inner face (23) of the loading door, characterized in that at least one loading bridge (4, 5, 6) has at least one roller (11) on the outside and the roller (11) rolls off on the inner face (23) of the loading door.

2. The cargo receiving arrangement according to claim 1, characterized in that at least one loading bridge (4, 5, 6) has at least two groups (10) of rollers (11).

3. The cargo receiving arrangement according to claim 2, characterized in that at least one loading bridge (6) rolls off on at least two rollers (11) from different groups (10) of rollers on the inner face (23) of the loading door.

4. The cargo receiving arrangement according to claim 2, characterized in that at least one loading bridge (6) has four groups (10) of rollers (11) and that at least one loading bridge (6) rolls off on two rollers (11) from two non-adjacent groups (10) of rollers (11) on the inner face (23) of the loading door.

5. The cargo receiving arrangement according to claim 1, characterized in that at least one loading bridge (6) has four groups (10) of rollers (11) and that the loading bridge (6) rolls off on two rollers (11) from two non-adjacent groups (10) of rollers (11) on the inner face (23) of the loading door.

6. The cargo receiving arrangement according to claim 1, characterized in that the inner face (23) of the loading door has a roll-off surface (21).

7. The cargo receiving arrangement according to claim 6, characterized in that the roll-off surface (21) is designed wedge-like when viewed in cross section.

8. The cargo receiving arrangement according to claim 6, characterized in that the roll-off surface (21) is adapted in its dimensions to the roll-off path of an assigned roller (11) of at least one loading bridge (6).

9. The cargo receiving arrangement according to claim 1, characterized in that at least one loading bridge (4, 5, 6) is pretensioned with a spring (15).

10. The cargo receiving arrangement according to claim 9, characterized in that the spring (15) pretensions at least one loading bridge (4, 5, 6) into a horizontally unfolded position.

11. The cargo receiving arrangement according to claim 9, characterized in that the spring (15) is arranged in the swiveling axis (7, 8, 9) of at least one loading bridge (4, 5, 6).

12. The cargo receiving arrangement according to claim 9, characterized in that the spring (15) is split and fixed and pretensioned in the middle on the cargo receiving area (1).

\* \* \* \* \*